United States Patent

Franken et al.

[11] Patent Number: 5,259,572
[45] Date of Patent: Nov. 9, 1993

[54] TOWING VEHICLE WITHOUT DRAW TONGUE FOR TOWING AIRCRAFT

[75] Inventors: Wilhelm Franken, Wesel; Ernest Kretschmann; Gerhard Weigardt, both of Oberhausen; Heinrich Goris, Hamminkeln; Torsten L. Michaelsen, Herdecke; Dieter Pohe, Gelsenkirchen, all of Fed. Rep. of Germany

[73] Assignee: Man Gutehoffnungshutte Aktiengesellschaft, Oberhausen, Fed. Rep. of Germany

[21] Appl. No.: 940,189

[22] Filed: Sep. 3, 1992

[30] Foreign Application Priority Data

Sep. 4, 1991 [DE] Fed. Rep. of Germany ....... 4129407
Feb. 6, 1992 [DE] Fed. Rep. of Germany ....... 4203377

[51] Int. Cl.⁵ .............................................. B64C 25/50
[52] U.S. Cl. ..................................... 244/50; 180/14.7; 180/904; 414/426; 414/429
[58] Field of Search ................. 244/50; 180/14.7, 904; 414/426–430

[56] References Cited

U.S. PATENT DOCUMENTS 4,911,603 3/1990 Pollner et al. .................. 414/428

5,054,714 10/1991 Franken et al. .................. 244/50

FOREIGN PATENT DOCUMENTS 0394535 10/1990 European Pat. Off. ........... 180/904
3732664 9/1988 Fed. Rep. of Germany ...... 180/904

Primary Examiner—Margaret A. Focarino
Assistant Examiner—Christopher P. Ellis
Attorney, Agent, or Firm—McGlew and Tuttle

[57] ABSTRACT

A vehicle with its own traveling gear for towing an aircraft without draw tongue, has a U-shaped chassis frame recess that is open in the forward direction with a clamping and lifting device arranged therein for the nose wheels of an aircraft. The clamping and lifting device, which is oscillatingly suspended on the chassis frame 1, includes a pivoting and lifting ramp 8, as well as two parallel telescoping arms 10 arranged rigidly on the pivoting and lifting ramp 8, with telescoping cylinders 11 and with gripping arms 14, which can be pivoted in and whose nose wheel contact surfaces 18 are rigidly attached to the gripping arms 14, and of telescopingly adjustable holddown devices 12, 13, which are hinged to the support 7.

FIG. 3 shows the clamping and lifting devices with the nose wheels 17 lifted.

10 Claims, 3 Drawing Sheets

TOWING VEHICLE WITHOUT DRAW TONGUE FOR TOWING AIRCRAFT

FIELD OF THE INVENTION

The present invention pertains in general to a towing vehicle with a wheel chassis and its own traveling means for towing an aircraft without draw tongue, and in particular to a vehicle which has an open, U-shaped recess with a clamping and lifting device arranged therein for the nose wheel landing gear of the aircraft.

BACKGROUND OF THE INVENTION

Similar aircraft tow vehicles without a draw tongue and for towing or moving aircraft in airports have been known since the 1980s. They are now also used for such operations as push-back, towing maneuvers in aircraft-building hangars and halls, and even as towing vehicles for towing over longer distances in airports.

The aircraft towing vehicles without draw tongues designed by various manufacturers have also now proved to be successful for use in domestic and foreign airports. One disadvantage of these vehicles can be considered to be the fact that the airports or airline companies usually have to purchase two types of aircraft towing vehicles for towing aircraft, because a single type of towing vehicle is unable to handle all types of aircraft. This can be attributed to the differences in the designs of the nose wheel landing gears of the aircraft.

The aircraft towing vehicles which are designed for moving aircraft at higher speeds even over longer distances are relatively bulky and expensive. The cost is correspondingly high, so that such aircraft towing vehicles become uneconomical if they are used exclusively for push-back operation.

SUMMARY AND OBJECTS OF THE INVENTION

The task of the present invention is to provide an aircraft towing vehicle without draw tongue which has a simple design, is short, has good maneuverability, and yet permits reliable operation. The cost of this aircraft towing vehicle is low compared with the cost of the prior-art types of towing vehicles.

Only a low km/h performance is required for its intended use as mainly a push-back vehicle, i.e., mainly for manoeuvering aircraft from the passenger ramp to the apron. In addition, this towing vehicle shall be able to lift up and tow aircraft with different nose wheel diameters.

The present invention includes a ramp or ramp means receiving, pivoting and lifting the nose wheel of the landing gear. Telescoping arms extend along side the landing gear and gripper arms move in behind the nose wheel on a side of the nose wheel opposite the ramp means. The gripper arms are moved into the path of the landing gear, to prevent the landing gear from moving out of the substantially U-shaped recess in the vehicle. Telescoping actuator means retract the telescoping arms and draw the nose wheel against the ramp means. The telescoping arms are ridgedly connected to the ramp means and the telescoping arm is substantially parallel to the ground before the landing gear is lifted. When the telescoping actuator means has finished drawing in the landing gear, the space between the gripper arm and the ramp means is smaller than a diameter of the nose wheel. A holddown means applies force to a portion of the nose wheel which is substantially opposite the ramp means and the gripper arm. A lifting means then pivots the ramp means, the telescoping arm and the gripper arm in order to lift the landing gear clear of the ground. The ramp means is rotatably connected to the chassis by a self-aligning bearing. This self-aligning bearing is part of an oscillating suspension means which is very beneficial during turning maneuvers of the vehicle and the aircraft. The lifting means has one end connected to the chassis and another end connected to the ramp means. The holddown means has as holddown device moveable into and out of contact with the nose wheel and a holddown actuator means for moving the holddown device into and out of contact with the nose wheel. The holddown actuator means has one end connected to the holddown device and another end connected to a support element between the chassis and the ramp means.

The aircraft towing vehicle according to the present invention is a relatively short and compact vehicle. The drive power is relatively low, because only speeds of up to 10 km/h are required for the push-back operation. The towing vehicle operates economically in every respect, and the fuel consumption is obviously lower than in the prior-art, large aircraft towing vehicles. As a consequence of the simple design, the vehicle according to the present invention is relatively economical in terms of the purchase and maintenance costs.

One particular advantage of the aircraft towing vehicle according to the present invention is the fact that the hydraulically operated nose wheel lifting device, consisting of the pivoting and lifting ramp with the clamping device, i.e., the telescoping arms with pivoting gripping arms and the holddown devices, are combined in an intelligent functional design.

The operator of the aircraft towing vehicle has optimal view of the clamping and lifting device and the aircraft from the driver's cabin, which is located in the rear part of the towing vehicle. The aircraft towing vehicle is designed for travel in both directions.

Reliable balancing is guaranteed during travel in curves due to the fact that the entire clamping and lifting device of the draw tongue-less towing vehicle is hinged to the chassis via a pivot bearing.

The rigid arrangement of the telescoping arms on the pivoting and lifting ramp represents a particularly simple and solid design. The design of the pivotable gripping arms, which have only nose wheel contact surfaces rigidly attached to the gripping arms, and no rollers, like the gripping arms of prior-art aircraft towing vehicles without draw tongues, is also simple and favorable in terms of maintenance.

The distance between the gripping arms and the ground remains constant when the pivoting and lifting ramp is lowered, and the gripping arms are arranged at a level that guarantees that accurate clamping of the nose wheels is made possible, on the one hand, and collision with deflectors, which are arranged on some aircraft nose wheel landing gears, is positively ruled out, on the other hand.

The fact that the clamping forces are maintained at a constant value according to the present invention during the entire pick-up and lifting process of the aircraft nose wheels guarantees that the nose wheels are absolutely secured against slipping off from the clamping between the gripping arms of the telescoping arms and the pivoting and lifting ramp during this process.

The telescoping arms with the gripping arms for clamping the nose wheels of the aircraft are usually operated via hydraulic telescoping cylinders or telescoping actuating means. However, as an alternative, the telescoping arms may also be operated mechanically, i.e., via spindle drives. Pneumatically driven telescoping arms is only not considered for this application for economic reasons.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
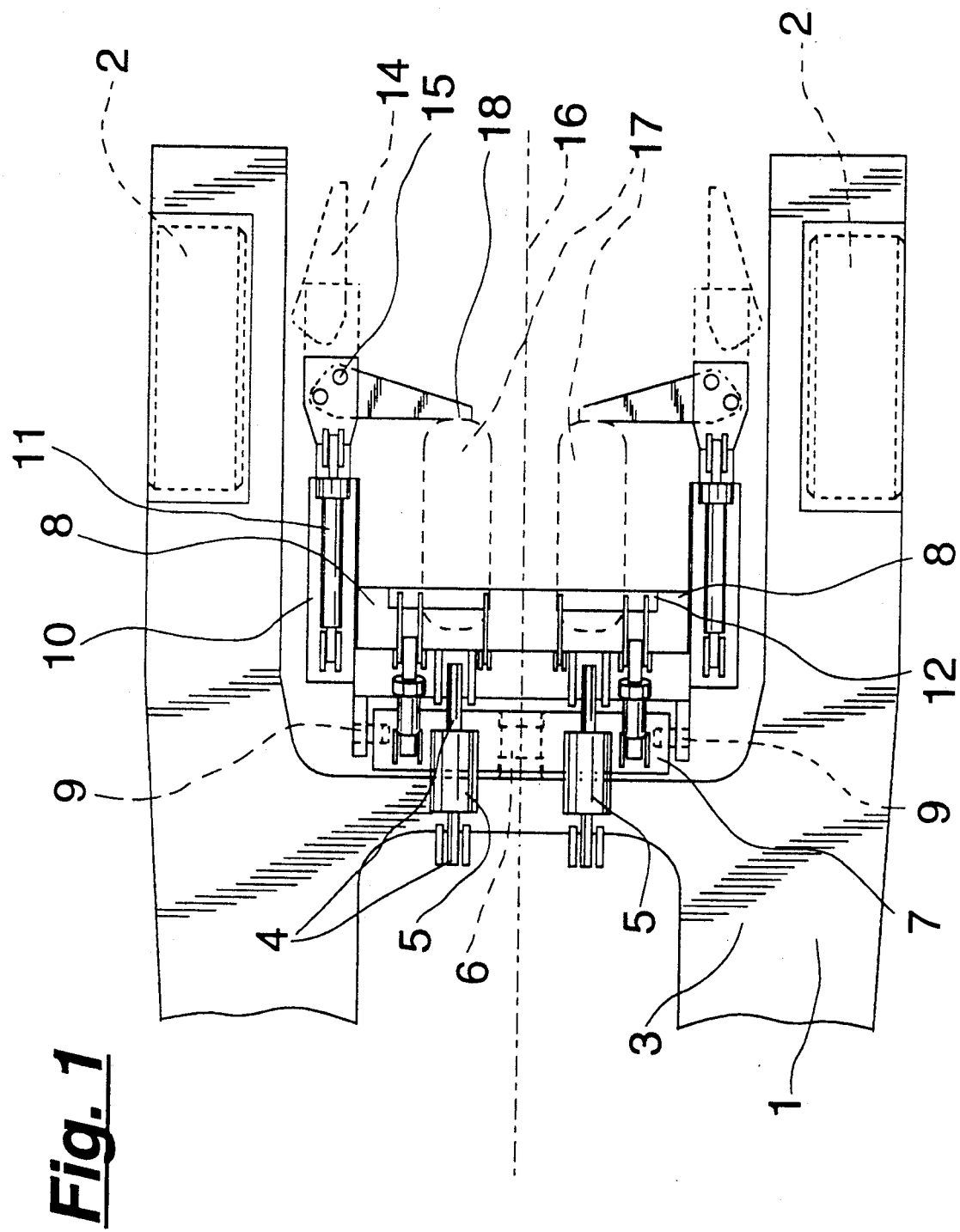
FIG. 1 shows a top view of an oscillatingly suspended clamping and lifting device on an aircraft towing vehicle.

In the top view of the front part of the towing vehicle for towing aircraft without draw tongue according to FIG. 1, one can recognize the wheels 2 of the towing vehicle, which has, in the chassis frame 1, a U-shaped recess 16 that is open in the direction of travel, with a clamping and lifting device or containment means mounted oscillatingly therein.

The clamping and lifting device consists of the pivoting and lifting ramp or ramp means 8, the telescoping arms 10 arranged rigidly on both sides with telescoping cylinders or telescoping actuating means 11 and pivotable gripping arms 14, the locking mechanisms 15, as well as the cylinders 13 with the two holddown devices 12 for the nose wheels 17.

The pivoting and lifting ramp 8, which is intended to receive and lift the nose wheels 17 of the aircraft in cooperation with the gripping arms 14, has a ground clearance and a ramp slope of ca. 45° prior to lifting the nose wheels 17. The telescoping arms 10 with the telescoping cylinders 11 and gripping arms 14 that can be pivoted in and out are always located within the U-shaped chassis frame recess 16 of the towing vehicle. The telescoping arms 10 are arranged rigidly on the pivoting and lifting ramp 8.

FIG. 1 shows a crossbar 3, which is rigidly arranged on the chassis frame 1. Lifting cylinders or means 5 for the pivoting and lifting ramp 8 are hinged to first and second lifts drag bearings 4. The pivoting and lifting ramp 8 is mounted with a support element 7 on the bolt of self-aligning bearing 6. The self-aligning bearing 6 is mounted on the crossbar 3 and the pivoting and lifting ramp 8 can be pivoted in support drag bearings 9 arranged laterally on the support element 7.

Figure 2:
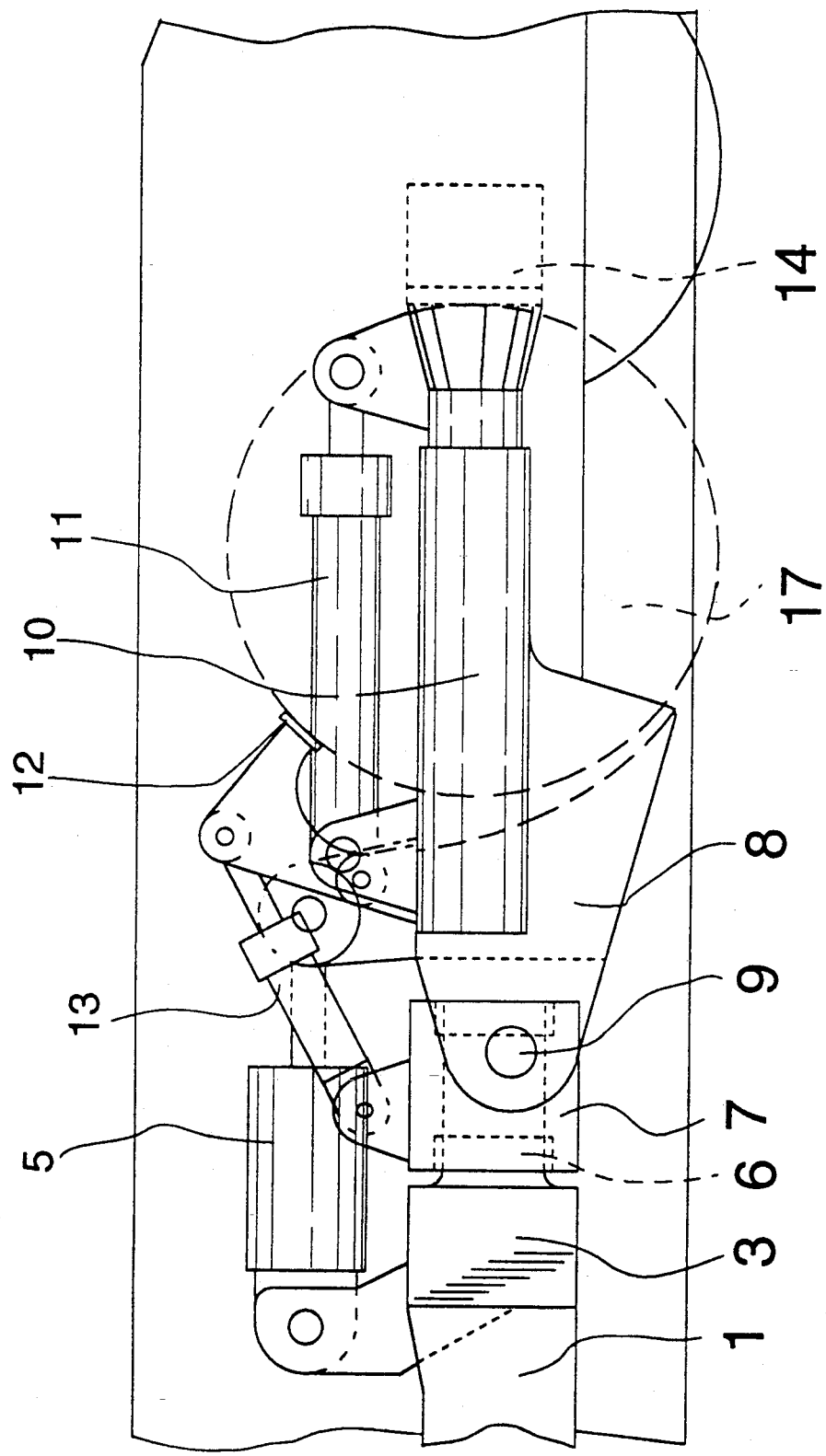
FIG. 2 shows a side view of the clamping and lifting device with clamped nose wheels, which still rest on the ground.
Figure 3:
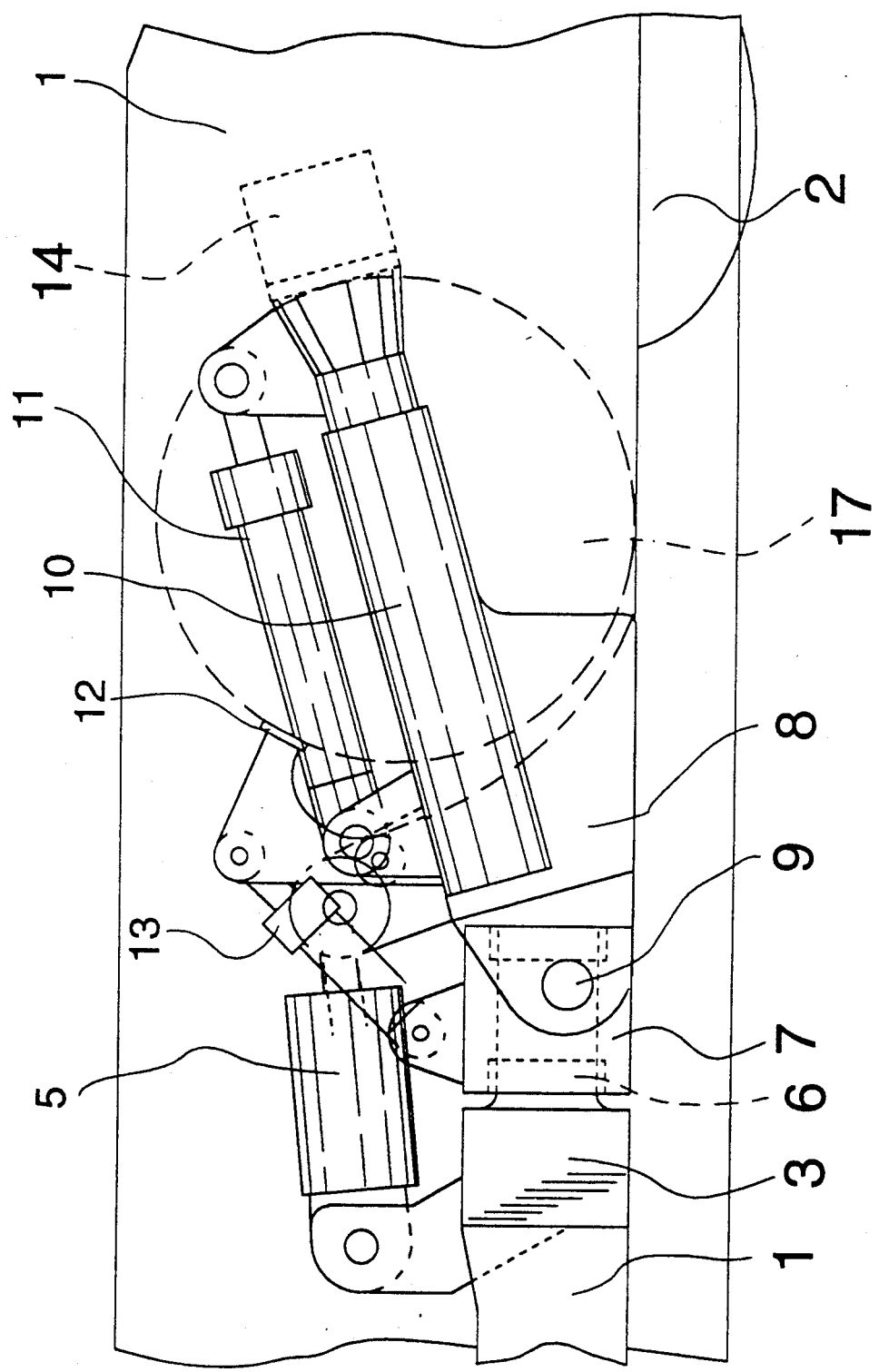
FIG. 3 shows a side view of the clamping and lifting device according to FIG. 2 with the nose wheels lifted off the ground.

As is apparent from FIGS. 2 and 3, the two telescoping arms 10 are arranged rigidly on both sides of the pivoting and lifting ramp 8. The telescoping cylinders 11, with the pivotable gripping arms 14 at the telescope tips, are located above the telescoping arms 10. After the gripping arms 14 have been pivoted in, they can be locked in this position via a locking mechanism 15.

The holddown devices 12 for the nose wheels 17, which are operated via cylinders or holddown actuator means 13, are also arranged on the pivoting and lifting ramp 8.

While FIG. 2 shows the clamping and lifting device during the phase of clamping of the nose wheels of the aircraft, FIG. 3 shows the situation after clamping and lifting.

According to FIG. 2, the nose wheels 17, still resting on the ground, are located in front of the lowered pivoting and lifting ramp 8. The gripping arms 14 are pivoted inward and clamp the nose wheels 17 with their contact surfaces 18. The telescoping arms 10 with the telescoping cylinders 11 are located horizontally and are withdrawn to press the nose wheels 17 against the pivoting and lifting ramp 8. The holddown devices 12 are also pressed against the nose wheels and thus prevent the nose wheels from deviating in the upward direction.

Depending on the type of aircraft, the nose wheels of aircraft may have different diameters. The clamping and lifting device according to the present invention is designed such that nose wheel pairs of any diameter of commercial airplanes can be lifted. As a consequence of the pivoting and lifting ramp 8 being designed as a type of oblique plane, sufficient contact surface is always available for nose wheels 17 of different diameters. The telescoping arms 10 with the telescoping cylinders 11 and the gripping arms 14, as well as the holddown devices 12 operated by the cylinders 13 can also be adapted to different nose wheel diameters.

The distance between the pivoting and lifting ramp 8 and the gripping arms 14 when the nose wheels 17 are clamped is smaller than the diameter of the nose wheels. During the clamping of the nose wheels, the gripping arms 14 are always at a such a level, regardless of the actual diameter of the nose wheels, that they cannot collide with the deflectors present on the nose wheel landing gears of some types of aircraft.

During the entire pick-up process, i.e., during the period between the situation according to FIG. 2 and that according to FIG. 3, constant hydraulic pump pressure is applied to the telescoping cylinders 11 of the telescoping arms 10. Since the nose wheel clamping forces do not change during this period, optimal clamping is guaranteed, but this clamping is also gentle for the nose wheel landing gear of the aircraft picked up.

If the position of the nose wheels 17 changes during the pick-up and lifting process, the telescoping arms 10 with their the gripping arms 14 are guided at the same time, so that clamping with the clamping forces once preset takes place in all cases.

The side view according to FIG. 3 shows the clamping and lifting device according to the present invention with the nose wheels 17 lifted up. The nose wheels 17, clamped by the pivoting and lifting ramp, the gripping arms 14, and the holddown devices 12 are pivoted upward by means of the lifting cylinders 5, and thus they have the ground clearance for towing the aircraft.

On completion of the towing process, the clamping and lifting device is pivoted back via the lifting cylinders 5 until the nose wheels 17 of the aircraft come into contact with the ground, while the towing vehicle is stopped. The clamping of the nose wheels is subsequently released, i.e., the gripping arms 14 are unlocked and pivoted out, and the telescoping arms with the telescoping cylinders 10, 11 are extended in the forward direction.

The operating stand of the towing vehicle, from which the operator controls all functions of the vehicle, is not shown in the patent figures.

While a specific embodiment of the invention has been shown and described in detail to illustrate the application of the principles of the invention, it will be understood that the invention may be embodied otherwise without departing from such principles.

What is claimed is:

1. A vehicle for towing an aircraft, the vehicle comprising:

a wheel chassis including traveling means for moving the wheel chassis, said wheel chassis defining a U-shaped recess open in the direction of travel of the vehicle;

a containment means positioned in said U-shaped recess and for containing a portion of the aircraft, said containment means including a ramp, said ramp pivoting on a support element of said chassis by support drag bearings, said containment means also including two substantially parallel telescoping arms rigidly mounted on and pivoting with said ramp, said containment means also including telescoping actuating means for extending said telescoping arms, said telescoping arms including gripping arms positioned on ends of said telescoping actuating means, said gripping arms being pivotable inward and including nose wheel contact surfaces, and said containment means also including holddown devices hinged to said ramp.

2. A vehicle in accordance with claim 1, wherein;
said telescoping arms are rigidly connected to said telescoping actuating means.

3. A vehicle in accordance with claim 1, wherein:
said telescoping arms and said telescoping actuating means are substantially parallel to a ground surface when initially picking up aircraft with different diameter nose wheels and with said ramp being in a lowered position, said telescoping arms and said telescoping actuating means being positioned on said ramp in order that a distance between said ramp and said gripping arms is smaller than a nose wheel diameter when a nose wheel is clamped inside said containment means.

4. A process for picking up the nose wheel landing gear of an aircraft on a towing vehicle, the process comprising the steps of:

moving the towing vehicle around the nose wheel landing gear of the aircraft;

extending telescoping arms of the towing vehicle along side the nose wheel landing gear;

pivoting and locking gripping arms, on said extended telescoping arms, around the nose wheel landing gear;

withdrawing said extended telescoping arms to clamp the nose wheel landing gear between said gripping arms and a ramp;

moving holddown devices of the towing vehicle onto a portion of the nose wheel landing gear substantially opposite said gripping arms and said ramp to clamp the nose wheel landing gear between said ramp, said gripping arms and said holddown devices;

after said clamping of the nose wheel landing gear by said gripping arms and said holddown devices, said ramp, said telescoping arms, and said holddown devices are together pivoted upward with respect to a chassis of the tow vehicle to an extent that ground clearance will be present even during oscillation of said ramp.

5. A process in accordance with claim 4, wherein:
said holddown devices are biased by a predetermined clamping force against said nose wheel landing gear;

said predetermined clamping forces are maintained at a substantially constant value during said pivoting of said ramp, said telescoping arms, and said holddown devices; and said telescoping arms, said ramp and said gripping arms are always guided together during changes in a position of the nose wheel landing gear during said pivoting of said ramp, said telescoping arms, and said holddown devices.

6. A process in accordance with claim 4, further comprising:

pivoting said ramp, said telescoping arms, and said holddown devices downward after said pivoting of said ramp, said telescoping arms, and said holddown devices upward, to an extent that the nose wheel landing gear will contact the ground; and subsequently extending said telescoping arms, unlocking and pivoting said gripping arms away from the nose wheel landing gear.

7. A vehicle for towing an aircraft by nose wheel landing gear, the vehicle comprising:

a chassis defining a substantially U-shaped recess open to a side of the vehicle said chassis including a crossbar forming a center side of said U-shaped recess;

a support element connected to said chassis and positioned adjacent said crossbar;

first bearing means for rotatably connecting said support element to said crossbar, said first bearing means including a self-aligning bearing and rotating about a first axis substantially parallel to a longitudinal axis of said chassis;

a ramp means for receiving the nose wheel landing gear, said ramp means being positioned in a center portion of said U-shaped recess;

second bearing means for rotatably connecting said ramp means to said support element, said second bearing means including a support drag bearing and rotating about a second axis substantially perpendicular to said longitudinal axis of said chassis;

a telescoping arm rigidly attached and pivoting with said ramp means, said telescoping arm extending along a side of said U-shaped recess;

gripping means positioned on another end of said telescoping arm and for containing the nose wheel landing gear inside the U-shaped recess, said gripping means including a gripper arm movable into and out of a path of the nose wheel landing gear;

telescoping actuator means for retracting said telescoping arm and drawing in the nose wheel landing gear when the nose wheel landing gear is in said U-shaped recess and said gripper arm is in said path of the nose wheel landing gear, said telescoping actuator means clamping the nose wheel landing gear between said ramp means and said gripper arm;

holddown means for applying force on a portion of the nose wheel landing gear substantially opposite said gripping arm and said ramp means in order to clamp the nose wheel landing gear between said ramp means, said gripping arms and said holddown means with a predetermined clamping force, said holddown means including a holddown device pivotably mounted on said ramp and movable into and out of contact with said portion of said nose wheel landing gear;

lifting means for pivoting said ramp means, said telescoping arm and said holddown device together about said second axis and lifting the clamped nose wheel landing gear, said lifting means having one end connected to said chassis and another end connected to said ramp means; and holddown actuator means for moving said holddown device into and out of said contact with said portion of said nose wheel landing gear, said holddown actuator means having an end connected to said holddown device and another end connected to said support element.

8. A vehicle in accordance with claim 7, wherein:
said ramp means has a curved surface for receiving different diameter nose wheels.

9. A vehicle in accordance with claim 7, wherein:
said clamping force does not substantially change during said lifting of the clamped nose wheel landing gear.

10. A vehicle in accordance with claim 1, further comprising:

self-aligning bearing means for rotatably connecting said support element to a portion of said chassis;

lifting cylinder means for pivoting said ramp about said support drag bearings, said lifting cylinder means being connected at first and second ends by lift drag bearings to said chassis and to said ramp.

* * * * *